United States Patent [19]
Joice

[11] 3,921,827
[45] Nov. 25, 1975

[54] ARMS FOR STACKING MACHINE

[76] Inventor: Richard L. Joice, 19812 Lassen St., Chatsworth, Calif. 91311

[22] Filed: Apr. 10, 1974

[21] Appl. No.: 460,023

Related U.S. Application Data

[63] Continuation of Ser. No. 268,494, July 3, 1972, abandoned.

[52] U.S. Cl............. 214/6 FS; 198/210; 214/1 BV; 214/8; 271/196
[51] Int. Cl.².......................................... B65G 57/08
[58] Field of Search.......... 214/1 BV, 6 FS, 8, 6 DS; 198/210; 271/82, 194, 196, DIG. 10

[56] References Cited
UNITED STATES PATENTS

| | | | |
|---|---|---|---|
| 3,070,212 | 12/1962 | Shabram.......................... | 271/196 X |
| 3,462,026 | 8/1969 | Maccherone.................... | 198/210 X |
| 3,616,942 | 11/1971 | Gruber............................. | 198/210 X |
| 3,633,731 | 1/1972 | Jones................................ | 214/8 X |
| 3,822,008 | 7/1974 | Benner et al. ................... | 198/210 X |

Primary Examiner—Robert J. Spar
Assistant Examiner—Leslie J. Paperner
Attorney, Agent, or Firm—Richard L. Joice

[57] ABSTRACT

Arms are mounted on a rotary hub which is driven so that the arms take up bags newly made by a bag-making machine and deliver the bags in regular order for stacking in a basket or for delivery onto mounting wickets. The arms have two faces which can be positioned so that one of the faces selectively engages the newly-made bag. Which of the faces is employed is determined by whether the bags are to be stacked in baskets or wicketed. The rotary hub carrying the arms rotates adjacent a manifold which controls the vacuum supply to the arms. The manifold is connected by two pipes to the vacuum source to maintain vacuum supply through the manifold.

6 Claims, 15 Drawing Figures

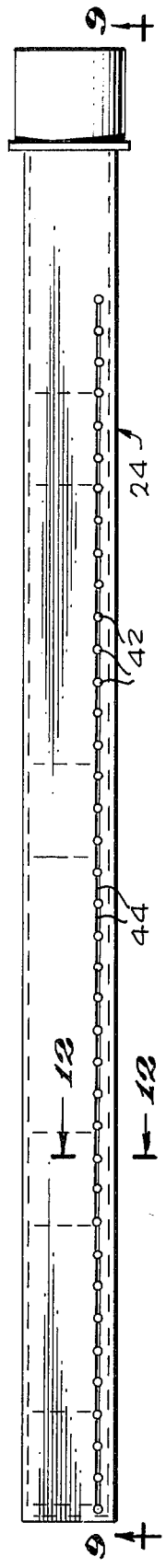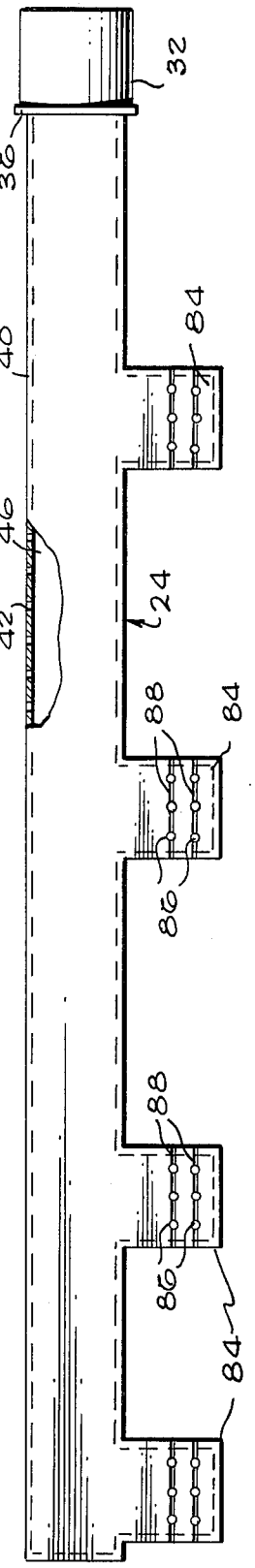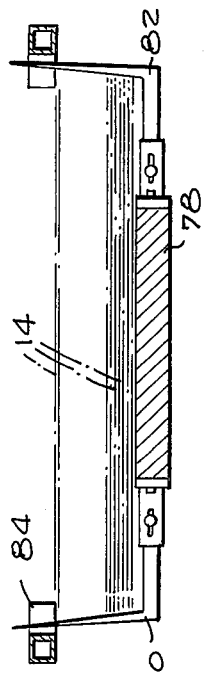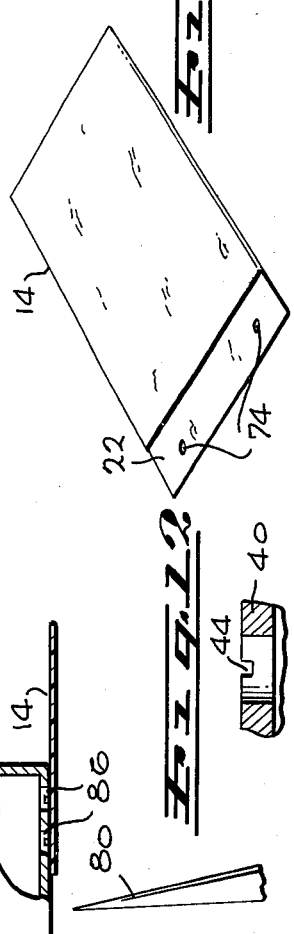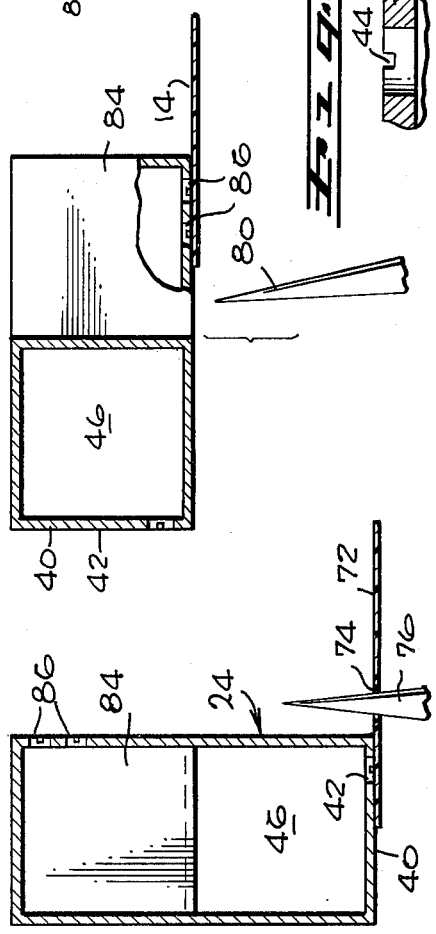

ARMS FOR STACKING MACHINE

This is a continuation of application Ser. No. 268,494, filed July 3, 1972, now abandoned.

BACKGROUND OF THE INVENTION

1. Field of the Invention

This invention is directed to arms for a stacking machine, which arms engage the newly-made bag and deliver it for stacking.

2. Description of the Prior Art

Automatic plastic bag-making machines are well-known in the art. They receive polymer composition material film, such as polyethylene film, and perform the necessary operations on the film to produce a new bag. Often, the bag-making comprises folding the film and sealing several edges so that three edges are closed. Sometimes gussets are formed. When the bags are intended for wicketing, one of the bag sides extends past the other to form a single layer lip, and in this lip are perforated one or more holes for later wicketing of the bag. When basket stacking of the new bags is desired, the extended lip with its wicketing holes is not necessary.

One of the convenient automatic ways of employing such bags is to have them stacked on the wickets so that a properly directed airblast enters over the lip mounted on the wickets and opens the bag. Thereupon, the product can be inserted into the open bag. In known wicketing equipment, the wickets carrying bags are periodically advanced from the point where they receive bags to the point of bag filling.

SUMMARY OF THE INVENTION

In order to aid in the understanding of this invention, it can be stated in essentially summary form that it is directed to arms for a stacking machine, which arms are mounted on a rotary hub to pick up newly-made bags from a bag-making machine and deliver the bags to the delivery point, the delivery point being a basket for the bags, or wickets upon which the bags are mounted. The arms are selectively positionable in the rotary hub which carries them to permit suitable bag engagement surfaces for wicketing or basket delivery of the bags.

It is, thus, an object of this invention to provide arms for a stacking machine, which arms are suitable for picking up bags as they are delivered from a bag-making machine, and to deposit the bags at a delivery point, the arms being selectively engageable, in accordance with whether or not the delivery point is a wicketing structure or a basket structure. It is a further object to provide a rotary hub which carries the arms for a stacking machine, the rotary hub being rotatably positioned with respect to a vacuum manifold so that the vacuum is controllably connected to the arms, with the manifold being connected to a vacuum source through at least two vacuum connections. It is still another object to provide arms which are readily and conveniently adjusted so that they can be alternatively employed for stacking bags in a basket or on wickets.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 8 is a top plan view of one of the arms shown in the position for picking up a bag for wicketing.

FIG. 9 is a side elevational view of the arm, as seen along the line 9—9 of FIG. 8.

FIG. 10 is an enlarged transverse section through the arm when it is in its position for wicketing.

FIG. 11 is a similar section through the arm when it is in its position for basket-stacking of bags.

FIG. 12 is an enlarged section, with parts broken away, taken generally along the line 12—12 of FIG. 8.

FIG. 13 is a transverse section through the delivery point of the bags, showing bags being stacked in a basket by the arms.

FIG. 14 is an isometric view of a bag having wicketing holes therein.

DESCRIPTION OF THE PREFERRED EMBODIMENT

Figure 1:
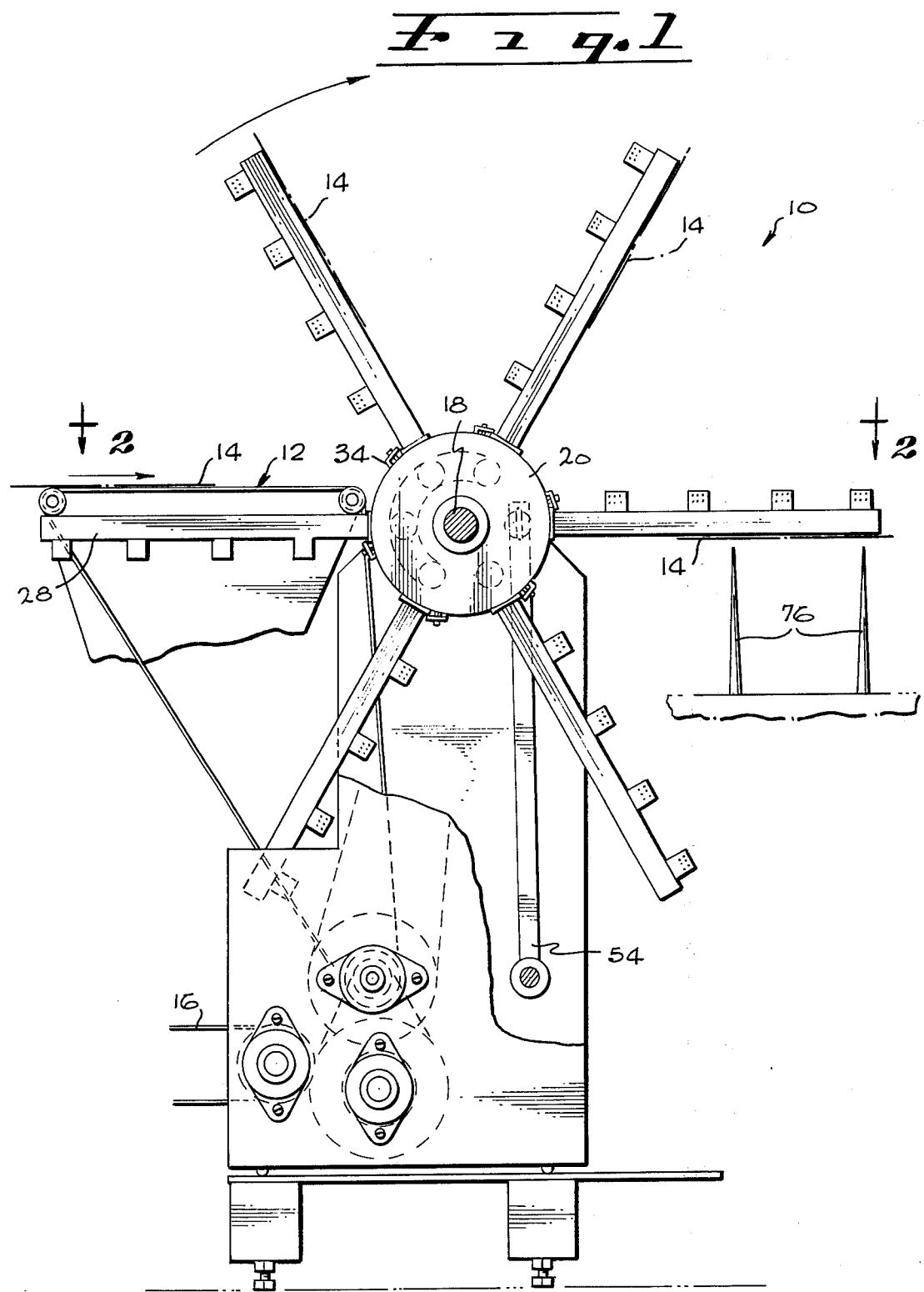
FIG. 1 is a side elevational view of a stacking machine, having the arm and hub structure in accordance with this invention.
Figure 2:
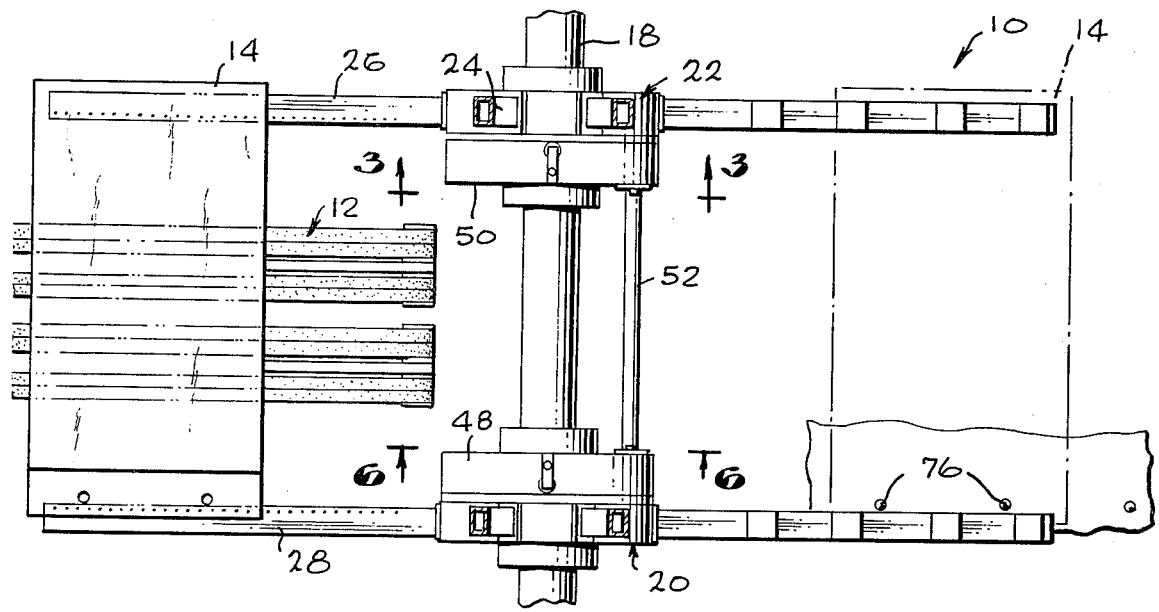
FIG. 2 is a section taken generally along the line 2—2 of FIG. 1, looking down upon the hub and arm structure.
Figure 3:
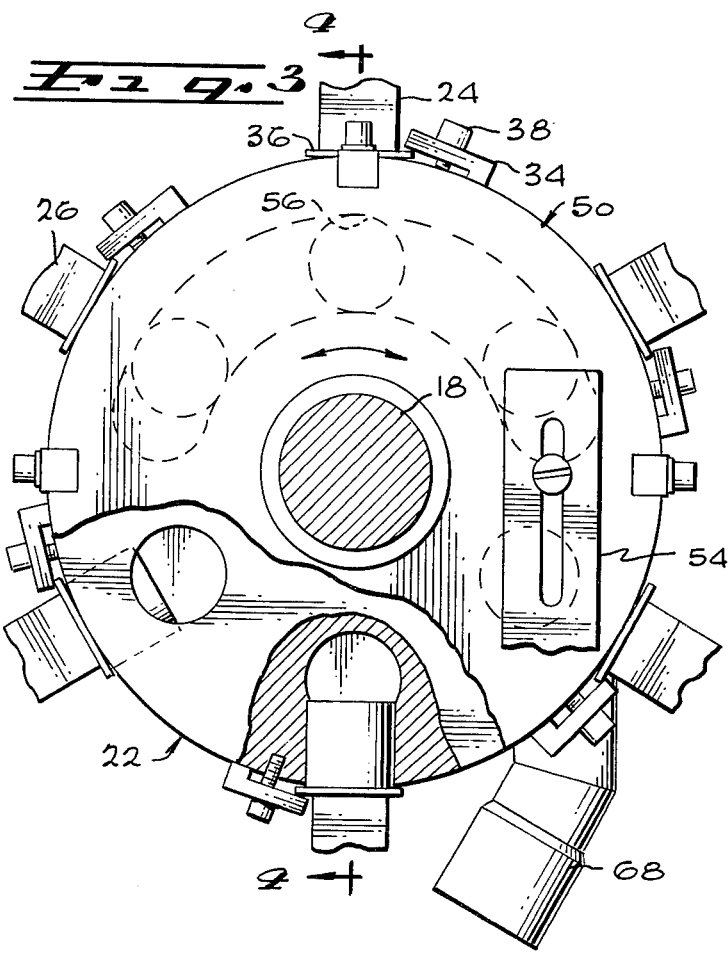
FIG. 3 is an enlarged section, with parts broken away, taken generally along the line 3—3 of FIG. 2.

A stacking machine, for which the arms and hubs in accordance with this invention are particularly suited, is generally indicated at 10 in FIGS. 1 and 2. The stacking machine 10 is positioned at the newly-made bag delivery conveyor 12 which delivers newly-made bags from a bag-making machine. One of the newly-made bags being delivered by conveyor 12 is indicated at 14, see also FIG. 14. The delivery conveyor 12 can either be driven by the bag-making machine or by the stacking machine 10. It serves as a link therebetween. FIG. 1 illustrates a drive 16 coming from the bag-making machine which, in turn, drives both delivery conveyor 12 and main shaft 18.

Main shaft 18 carries hubs 20 and 22 secured thereto for rotation therewith. Each of the hubs carries a plurality of arms, with arms 24 and 26 shown in FIGS. 2 and 3. Each of these hubs carries a plurality of arms, with the arms in aligned pairs. Thus, the hubs are secured to the shaft 18 so that corresponding arms are positioned as aligned pairs. Thus, arms 26 and 28 are parallel to each other and continue to be so as the hubs rotate. While one pair of such arms is satisfactory for operation, in order to increase the throughput of the stacking machines, it is preferable to have a plurality of pairs of arms. As is seen in FIGS. 1, 3, 5, 7 and 7A, six pairs of arms are illustrated.

Figure 4:
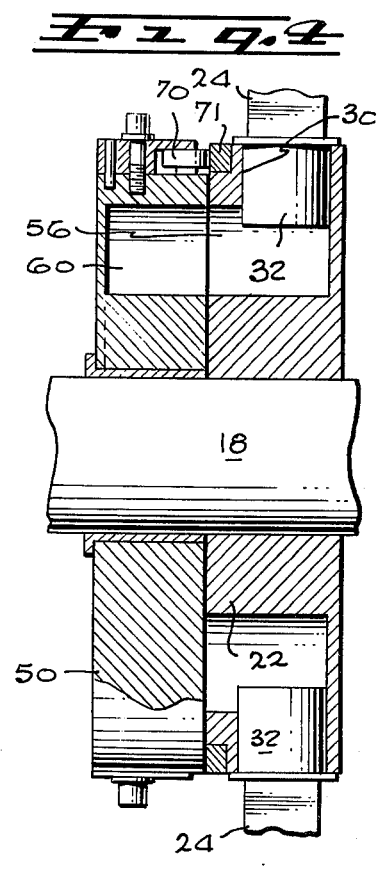
FIG. 4 is a section, with the center shaft shown in side elevation, taken generally along the line 4—4 of FIG. 3.

For each of the arms, there is a corresponding radial socket in the hubs. Socket 30 for arm 24 is illustrated in FIG. 4. Arm 24 has a shank 32 which fits into socket 30. The shank and socket are positioned so that the arm 24 is substantially radial with respect to main shaft 18, and are surfaces of revolution so that the arm 24 can be rotated about its axis substantially radial to main shaft 18. Each of the other arms is equipped in similar fashion.

Clamp 34 engages the outer surface of hub 22 and engages over flange 36 on the arm. Cap screw 38 pulls the clamp into place to retain the arm 24, so that when it is clamped it can neither rotate in socket 30 nor slide out of the socket. Upon loosening of the clamp, the arm can be rotated to a selected position.

FIGS. 8, 9, 10 and 11 illustrate the arm structure in detail. As previously stated, the arms have the same configuration. The arms in the same hub are identical, and the pairs of arms are symmetrical. Arm 24 has a working face 40 which is substantially rectangular in configuration, extending away from shank 32 and flange 36. The working face is substantially planar, except for a plurality of vacuum holes 42 which extend in a single straight line substantially the entire length of the working face along one edge thereof. Groove 44 extends down the line of vacuum holes, intersecting the holes and extending down into the working face to spread the vacuum down the entire length of the working face. Arm 24 is hollow and has vacuum conduit 46 through the length thereof.

Hub 20 acts in conjunction with manifold 48, while hub 22 acts in conjunction with manifold 50. Manifolds 48 and 50 are rotatably mounted on shaft 18 so that, as the shaft rotates, the manifold can be nonrotative. Manifolds 48 and 50 are connected together by means of coupler 52 so that they are both angularly arranged on the shaft axis in the same manner. Link 54, see FIGS. 1 and 3, interconnects the manifolds with the frame of the stacking machine so that the manifolds can be angularly positioned on the shaft and secured in the desired position.

Figure 5:
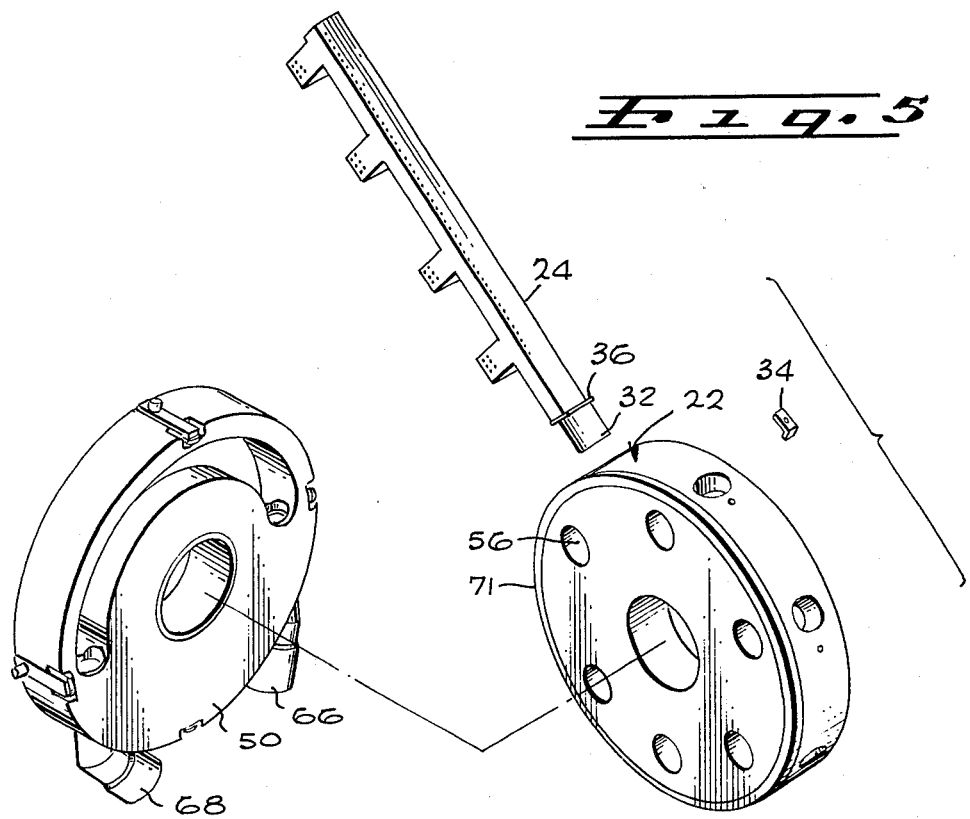
FIG. 5 is an exploded isometric view showing one of the hubs, one of the arms carried thereon, and the manifold with which it is associated.
Figure 6:
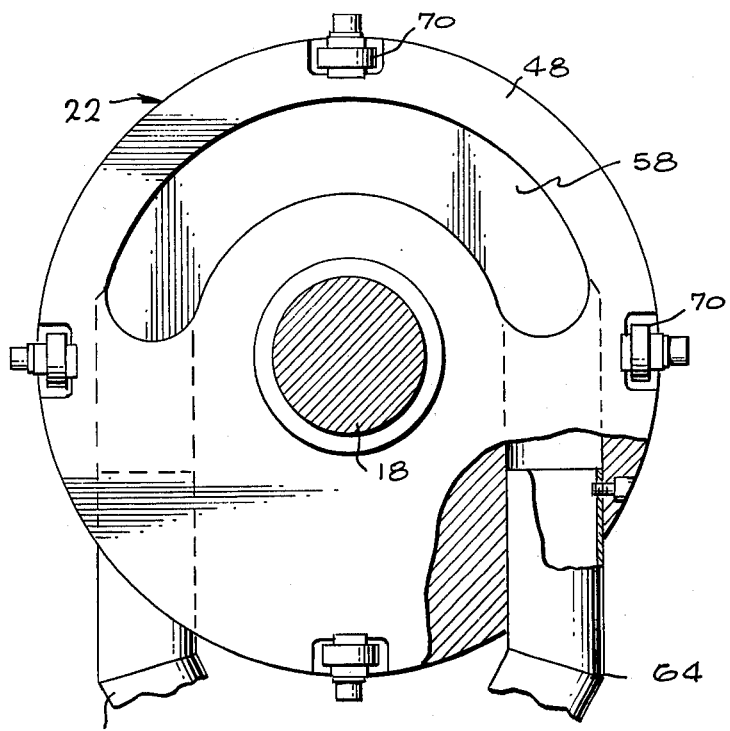
FIG. 6 is an enlarged section taken generally along the line 6—6 of FIG. 2, showing the face of the manifold, with certain parts broken away.
Figure 7:
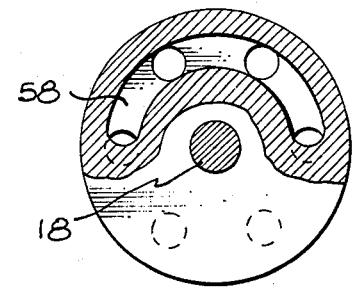
FIG. 7 is a simplified elevational view of the manifold, with parts broken away and taken in section, showing the relationship of the arm ports and the manifold port.
Figure 7A:
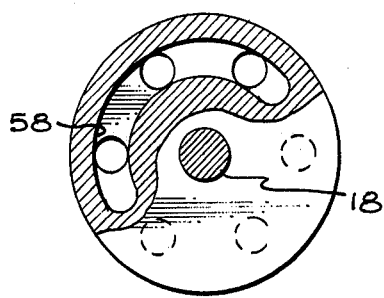
FIG. 7A is similar to FIG. 7, showing a different rotative adjustment of the manifold to adjust the position at which vacuum is turned on and off.

Each of the sockets 30 in which the arms are positioned is provided with an axial hole, such as the hole 56, intersecting the socket 30. These axial holes extend out of the hub toward the respective manifolds. Manifold 48, see FIG. 6, has a kidney-shaped port 58 at the same radial distance from the rotary axis of shaft 18 as the axial holes of which hole 56 is an example. Thus, the axial holes pass port 58. A similar port 60 is provided in manifold 50. Vacuum connections 62 and 64 are connected to the opposite ends of port 58 and are arranged to be connected to a source of vacuum. Similarly, vacuum connections 66 and 68 are connected to opposite ends of port 60 and are adapted to be connected to a source of vacuum. Two vacuum connections to each hub are preferred, in order to equalize vacuum at the ends of the large manifold port. When the vacuum is supplied, the manifolds are respectively pulled toward their corresponding hubs. In order to prevent direct physical engagement, which would result in undesirable wear, rollers 70, see FIGS. 4, 5, and 6, are positioned to maintain a minimum spacing betwen the faces of the corresponding manifolds and hubs to minimize both wear and leakage. Annular wear ring 71 is engaged by these rollers. The kidney-shaped ports 58 and 60 are positioned so that, as the hubs and arms rotate in the clockwise direction, as seen in FIG. 1, the arms 26 and 28 coming up underneath the bags 14 are connected to vacuum through their corresponding axial holes being in alignment with the ports in the manifolds, and thus through the vacuum connections to the vacuum source. Thus, the rising arms engage the bag, pick up the bag 14 and hold it in place on the arms. The groove 44 provides a vacuum channel over the entire length which is covered by bag 14 to spread the vacuum under the bag. As previously described, the rotation of the arms is coordinated with the delivery of the bag 14 so that the bag is picked up in a known position.

Bag 14, see FIGS. 2 and 14, has a lip 72 through which one or more wicketing holes 74 are provided. It is the marginal edge of lip 72 beyond wicketing holes 74 that is engaged by the arm, see FIGS. 2 and 10, so that the wicketing holes are accessible. The bag 14 is carried a half revolution, or other convenient rotary segment, and is delivered to wicketing pins 76. Bag 14 is delivered to the wicketing pins by having the pins engage into the wicketing holes 74. Thereupon, the vacuum is released by having the axial hole corresponding to that arm being moved away from the kidney-shaped vacuum port in the corresponding manifold, see FIGS. 7 and 7A. The manifolds are angularly adjusted to achieve vacuum cessation at the correct angular position of the arms, as illustrated in these FIGURES. In wicketing, usually a plurality of bags are placed on a set of wicket pins and, thereupon, the wicket pins can be advanced as required. On the other hand, advance may occur for each bag deposited on the wicketing pins so that the bags can be individually advanced to a filling station.

In some cases, it is desired that the bags be stacked in a basket, instead of being wicketed. The arms in accordance with this invention are particularly designed so that they can be rotated upon their axes in order to be suitably configured for placing the bags in a basket. FIG. 13 illustrates the basket 78 having end guide pins 80 and 82.

on the side opposite from working face 40, the arms are provided with fingers 84. There are at least two fingers 84, and preferably four, as illustrated in FIG. 9. On the active faces thereof, each of the fingers has a plurality of vacuum holes 86 therein, preferably arranged in two rows, as illustrated. A groove 88 preferably extends along the active face of the fingers through the holes to provide a vacuum channel in the active face.

When the bags 14 are to be placed in a basket, the arms are rotated in their hubs so that the active faces of the fingers 84 come up underneath the bags as they are delivered by conveyor 12. The bags are picked up by the fingers from the conveyor with the application of vacuum to the vacuum holes in the hubs, through the porting previously described. Thereupon, the bag is carried through a fractional revolution to the basket. The guide pins 80 and 82 on the basket are positioned so that they pass between the fingers 84 on the arms and, when the bag is between the basket and guide pins, the vacuum is turned off by means of the previously-described porting. Thereupon, the bag can settle into the basket constrained by the guide pins. FIG. 11 illustrates the position in which the bag is just approaching the basket at the top of the guide pins. This is the position at which the vacuum is about to be shut off.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. In a stacking machine for picking up bags and moving them to the delivery position, the stacking machine having a central shaft upon which are mounted hub means for rotation about the axis of said shaft, first and second arms being mounted in said hub means, the improvement comprising:

said first and second arms having a first working face with first vacuum holes therein, and said arms having a second working face with second vacuum holes therein, said second working face being angularly disposed with respect to said first working face, each of said arms being selectively positionable within its hub means so that said arms can carry either said first working face or said second working face in bag-engaging position.

2. The apparatus of claim 1 wherein
said second working face is comprised of a plurality of fingers extending from said arm, said plurality of fingers each having a second vacuum hole therein, said plurality of fingers being aligned so that several fingers can engage the edge of a bag.

3. The apparatus of claim 2 wherein
said first arm is rotatably mounted in a first hub on a first axis substantially at right angles to the rotational axis of said hub, so that said arm can be rotated from a position wherein said first working face is in engagement position to a position where said second working face is in engagement position.

4. The apparatus of claim 3 wherein
said first arm is hollow and wherein said first arm is connected through said first hub for vacuum connection.

5. The apparatus of claim 4 wherein
said first hub faces a first manifold, said first manifold having an arcuate port therein for communication with said first arm, said arcuate port having a vacuum connection adjacent each end thereof.

6. The apparatus of claim 2 wherein
said first arm is hollow and wherein said first arm is connected through said first hub for vacuum connection.

* * * * *